INVENTORS
Thomas E. Bjorn.
Norman H. Kadivnik.

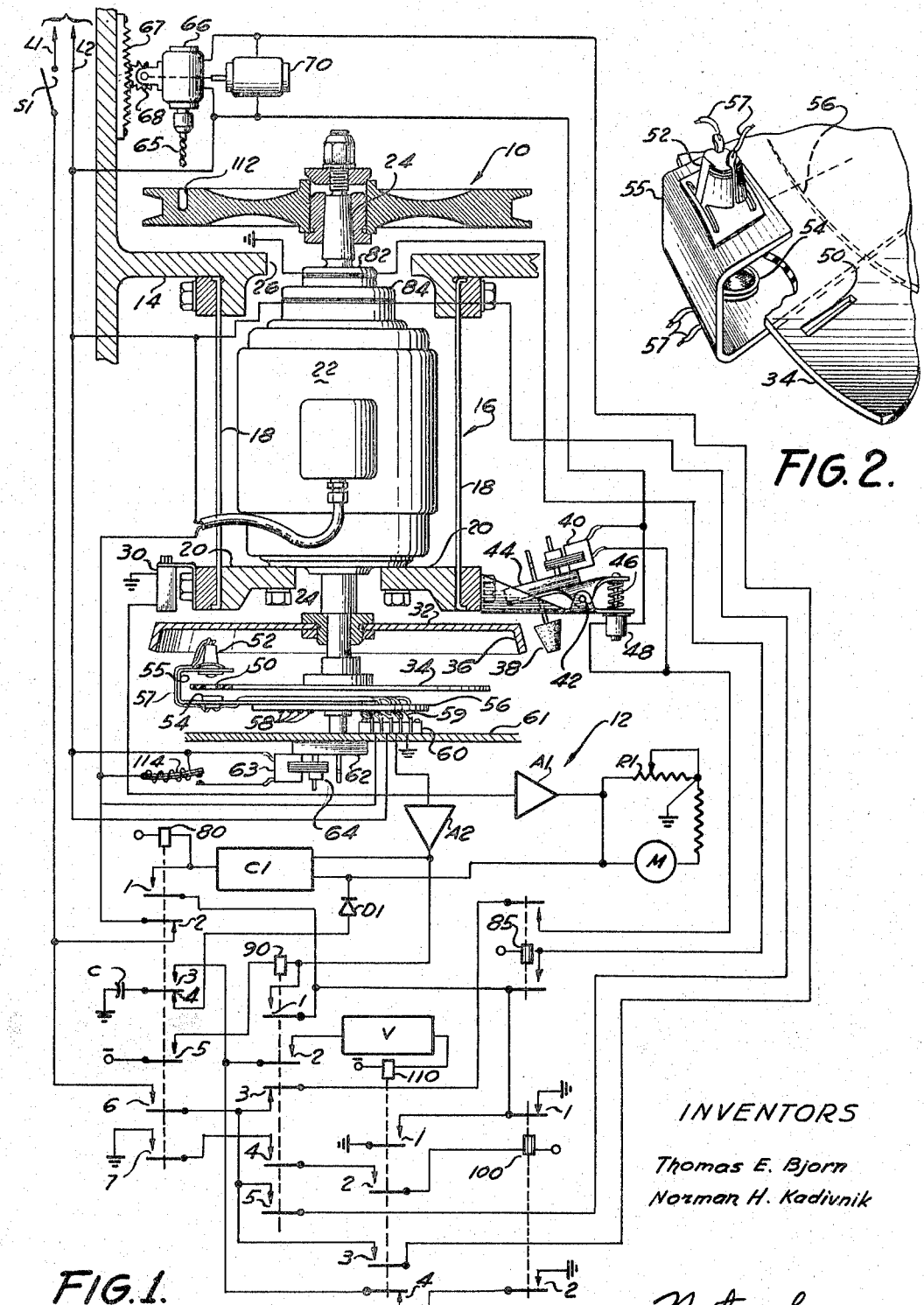

By Norton Lesser
ATTORNEY

United States Patent Office 3,302,491
Patented Feb. 7, 1967

3,302,491
AUTOMATIC UNBALANCE LOCATION AND BALANCE APPARATUS
Thomas E. Bjorn, Northbrook, and Norman H. Kadivnik, Morton Grove, Ill., assignors to Stewart-Warner Corporation, Chicago, Ill., a corporation of Virginia
Filed Oct. 16, 1964, Ser. No. 404,237
7 Claims. (Cl. 77—5)

This invention relates in general to balancers and more particularly to an arrangement for automatically locating the unbalanced position of a rotatable workpiece and balancing the same without the use of a stroboscope lamp.

The usual apparatus of the industrial type for successively balancing a series of workpieces incorporates a spindle adapted to be rotated by a motor mounted between a pair of cradle arms which permit a rocking or pivoting movement in only one plane. The workpiece, which may be a pulley or similar device intended to be rotated rapidly in use, is mounted on the spindle and during rotation by the motor is adapted to swing in only the one plane in response to vibrations caused as the unbalanced position passes through that plane. These vibrations are detected by suitable pickup device while a reference mark appearing on the workpiece permits ascertainment of the angular displacement of the reference mark from the plane at the time the unbalance vibration is detected.

The reference mark is, of course, rotating rapidly and in order to cause the reference mark to appear stationary to the eye a stroboscope lamp is utilized for periodically scanning the rotating workpiece.

The position of the reference mark is thus noted visually with respect to the plane under control of signals generated by the vibration. The workpiece is then stopped and then usually manually rotated to bring the reference mark back into the position where it was noted during the passage of the unbalanced position through the plane. The unbalanced position is therefore located in the described plane and the workpiece may then be balanced by either removing or adding material at a position corresponding to said plane.

There are therefore several problems in the afore-described arrangement. One of the problems relates to the need for the operator to visually gauge the angular displacement of the reference mark from the aforementioned plane at the time the maximum unbalance is noted even where angular indicia is provided. Thus the accuracy of the operator's observations are directly related to a number of ambient factors such as his alertness and position with the result that highly inaccurate or inconsistent observations are made. A second problem relates to the need to provide a stroboscope lamp to render the reference mark visually stationary since the lamp is both expensive and subject to inaccuracies in use while contributing to operator fatigue.

It is therefore a primary object of the present invention to provide an arrangement for automatically locating the unbalance position of a workpiece or wheel.

It is a further object to automatically locate the balancing position in a rotatable workpiece without the need for a stroboscope lamp or similar device.

In order to automatically locate the unbalance position and to do this without a stroboscope lamp, the present invention utilizes a slotted disc which is rotated with the workpiece while a second independently rotated disc carries a small lamp and photocell on opposite sides of the first disc. When the lamp, photocell and slot are aligned, an electrical signal or pulse is generated by the photocell. If this pulse occurs simultaneously with the signal transmitted by the vibration pickup device a coincidence is established between the unbalance existing in the aforementioned plane and the location of the second disc.

Since the second disc is rotated slowly by a low power motor, the second disc is adapted to be stopped immediately so that a reference position of unbalance is located with respect to the plane. The workpiece spindle, since it is not easily stopped, is permitted to either coast to a stop or is progressively braked to a stop. The workpiece and first disc are then slowly rotated to again bring the slot into alignment with the lamp and photocell. A second pulse is therefore generated for automatically indicating that the unbalance position of the workpiece has been reestablished in the aforementioned plane. Thus, the unbalanced position of the workpiece is located automatically in a simple effective manner without the use of a stroboscope lamp. Operator fatigue and inaccuracies in observation caused either by the lamp or other factors is thus avoided.

With the position of unbalance located in the aforementioned plane, a drill located in that plane is automatically operated in accordance with the degree of unbalance indicated by the vibration pickup to remove a corresponding amount of material from the workpiece at that position.

It is thus possible to also automatically balance the workpiece, wherefore another object of the present invention is to provide an arrangement for automatically balancing a workpiece.

Other objects and features of this invention will become apparent on examination of the following specification and claims together with the drawings, wherein:

FIG. 1 is a fragmentary view of a balancing machine assembly together with circuit apparatus for use in automatically locating the position of unbalance of a rotatable workpiece and balancing the same;

FIG. 2 is a fragmentary perspective view of the reference signal generating apparatus.

Figure 3:
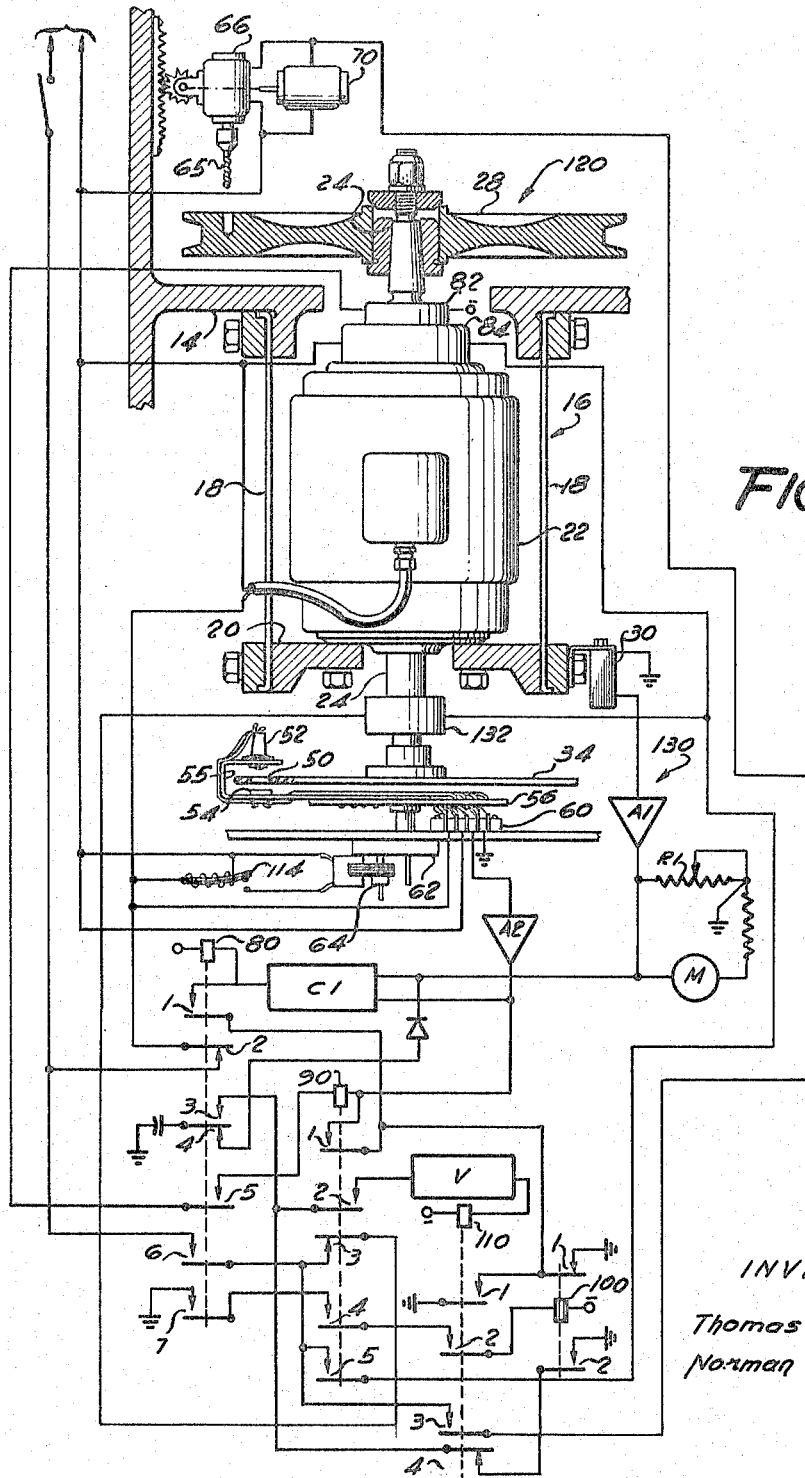
FIG. 3 illustrates another technique for automatically locating the unbalanced position of a rotatable workpiece and balancing the workpiece.

In FIG. 1 a portion of a balancing machine asembly incorporating the principles of the present invention is generally indicated by the reference character 10 and a control circuit for use with the machine assembly 10 is indicated by the reference character 12.

The machine assembly 10 comprises a conventional table 14 supported in a suitable manner and having a cradle 16 suspended therefrom. The cradle 16 comprises a yoke having vertical legs 18 and horizontal or back legs 20. The vertical legs 18 are bolted or otherwise suspended from beneath the table and a motor 22 whose housing interconnects the horizontal legs 20 is located between the legs 18. A spindle 24, adapted to be rotated by the motor 22, extends up through an opening 26 in the table and also depends from the motor below the back legs 20. A workpiece 28 such as a pulley or other rotatable member is secured to or clamped to the upper end of the spindle and is adapted to be rotated thereby ordinarily at about 900 r.p.m. for the purpose of ascertaining its balance condition.

The cradle 16 is formed so that the dimensions of the legs 18 are greater in a plane viewed as transverse to the plane of the paper than the cross sectional area of legs 18 shown in the plane of the paper. Thus the motor 22 and spindle 24 are adapted to vibrate, swing or pivot only in a vertical plane passing through the spindle 24 and vertical legs 18 and parallel to the plane of the paper, when an unbalanced position in the rotating workpiece 28 passes through that plane. The large transverse dimension of the legs 18 in a plane transverse or perpendicular to the paper prevents any notable vibration in other than the plane of the paper. A pickup device or assembly indicated at 30 is suspended from the cradle 16 in a conventional manner and serves to generate an electrical signal of one polarity when the unbalanced position of the workpiece passes one vertical leg 18 and a signal of opposite phase when the unbalanced position passes the other leg 18. The pickup assembly 30 may be of the type disclosed in Patent No. 3,071,007, issued January 1, 1963, to Bjorn et al., although many other well known types may be utilized.

The depending portion of the spindle 24, below motor 22, carries a pair of discs 32 and 34. The disc 32 has a peripheral flange 36 thereon to facilitate engagement with a normally disengaged friction drive member 38. The drive member 38 is adapted to be rotated by a low speed, high torque motor 40 pivotally carried on a pin 42. The motor 40 is adapted to drive the friction member 38 through a conventional gear box 44 and a spring 46 serves to bias the drive member 38 out of engagement with the flange 36 of disc 32. A solenoid 48 is adapted to be energized for engaging the friction drive member 38 with flange 36 when it is desired to drive the workpiece 28 at low speed.

The other disc 34 is provided with a slot 50 or any other type of suitable aperture for the transmission of light. An aligned lamp 52 and photocell 54 are carried on opposite sides of disc 34 by an arm 55. The arm 55 is suspended from a disc 56 coaxially rotatable with disc 34. The lamp 52 and cell 54 are thus adapted to be aligned with slot 50 for the purpose of generating a signal in the photocell 54 at that time. It will be appreciated of course that a wide variety of signal generating apparatus may be used such as for example capacitor segments in place of discs 34 and 56 or light conductive fibers on one disc for generating a signal whenever particular positions on discs 34 and 56 are aligned. Circuits to the lamp and photocell are established by means of leads 57 and commutator segments 58 on the disc engaging suitable brushes 59 connected to a terminal block 60 carried on a platform 61.

The disc 56 is adapted to be driven through a gear box 62 carried below platform 61 and the gears in the box are in turn adapted to be driven by a motor 63 having an armature 64. The motors 40 and 63 are of similar construction and are of a well known type such as used in TV tuners and manufactured by Molon Motor and Coil Company. When deenergized, the armature is permitted to drop, so that it disengages from the gears in the gear box. Thus the gears and connected drive apparatus come to an immediate stop when the motor is deenergized. If great precision of the stopped position is desired, brakes may be additionally supplied; however, for most purposes these are unnecessary since precision stopping is generally achieved with the motor 40. When the motor 40 is energized, the armature is drawn up into the magnetic field and serves to engage the gears for driving the connected apparatus.

Lastly, a drill 65, adapted to be rotated by a motor 66, is located above the workpiece 28 in generally the same plane as the cradle 16. A rack 67 and a pinion 68, adapted to be driven by a motor 70, are provided for moving the drill into engagement with the workpiece 28. It will be appreciated that other driving arrangements, such as a hydraulic medium, may be employed for moving the drill. Thus, by locating the maximum unbalanced weight of the workpiece below the drill, material may be removed from the workpiece 28 to balance the workpiece.

Power for the motors 22, 40, 63, 66 and 70 is furnished through a conventional A.C. source from leads L1 and L2 through a switch S1 with control being exercised by circuit 12. Power for circuit 12 is generally D.C. which is supplied from the A.C. source in any well known manner.

The circuit 12 includes an amplifier A1 for amplifying a signal detected by the pickup assembly 30 whenever an unbalance position of the workpiece passes through the plane of the cradle arms 18. The output of the amplifier A1 is extended to a suitable Meter M whose calibration may be set by an appropriate adjustable resistor R1. This permits visual ascertainment of the degree of unbalance. Amplifier A1 also feeds a capacitor C through a unidirectional element D1 and contacts 4 of a relay 80. Element D1 permits the passage of signals from device 30 of only one polarity. The capacitor C is thus charged to a level corresponding to the peak amplitude of the signal provided by pickup 30 which corresponds to the maximum unbalance of the workpiece.

The output of amplifier A1 is also connected to a coincidence circuit indicated by block C1. The output of the photocell 54 is connected to the coincidence circuit C1 through an amplifier A2 and whenever the slot 50 is aligned with the lamp 52 and photocell 54, a pulse is passed to the coincidence circuit C1.

Thus, if coincidence occurs between a pulse from photocell 54 and the output of pickup assembly 30, the coincidence circuit C1 generates a pulse for operating relay 80. Relay 80 at its contacts 1 completes a holding circuit and at contacts 2 opens the circuits for motors 22 and 63. Disc 56 stops immediately as explained so that cell 54 establishes a reference location for the position of unbalance which is now positively retained.

The motor 22 coasts to a stop, and when it terminates movement it closes a motion sensing switch indicated at 82, in any well known manner. If desired, a magnetic brake 84 may be temporarily operated to assist in braking motor 22. With the switch 82 closed, a slow-to release relay 85 is operated and locks operated to enable relay 80 to complete a circuit for motor 40 and solenoid 48 through its contacts 6 and through contacts 3 on a relay 90. The solenoid 48 now pulls the drive 38 into engagement with flange 36 against the bias of spring 46 to rotate the workpiece and disc 34 at slow speed.

At contacts 4 relay 80 in the meantime disconnects the capacitor C from D1, and at contacts 3 prepares to connect the capacitor C to a voltage sensing means V. At contacts 5 relay 80 prepares a circuit for relay 90, and at contacts 7 prepares a circuit for a slow-to-release relay 100.

As disc 34 now slowly rotates under control of motor 40, the slot 50 is again aligned with the stationary photocell 54 and a pulse is generated through amplifier A2 to now energize relay 90. Relay 90 locks, operated through its contacts 1, and at its contacts 3 opens the circuits for motor 40 and solenoid 48. At contacts 5 of relay 90 the brake 84 is energized, and the workpiece 34 is brought to an immediate stop with its maximum unbalanced weight located in the plane of the cradle arm 18 and under drill 65. At contacts 4 relay 90 further prepares a circuit for relay 100, and after operation of relay 110 relay 100 operates.

Relay 90 at its contacts 2 connects the charged capacitor C to the voltage sensing device V, which now senses the charge level of capacitor C to energize relay 110 for a time period corresponding to the charge on capacitor C and therefore the maximum unbalance. The voltage sensing device V, of course, includes a high impedance for insuring that the charge on C is not quickly dissipated. Relay 110 closes circuits to motors 66 and 70 at its contacts 3 to operate the drill 65 into engagement with the workpiece while the magnetic brake 84 holds the workpiece 28 stationary. Since the time period during which relay 110 is held operated is related to the amount of excess material to be removed, the drill 65 is held operated for a corresponding period. The drill 65 thus removes material as indicated by recess 112 in an amount sufficient to bring the workpiece into balance. The drill 65 is thereafter retracted in any well known manner. It will be appreciated that many other types of arrangements may be utilized either in place of or in conjunction with capacitor C for controlling the operation of drill 6 to remove the desired amount of material.

Relay 110 at its contacts 2, completes the circuit for slow-to-release relay 100, which opens its contacts 1 to open the original locking circuits for relays 80, 85 and 90.

Relays 80, 85 and 90 are, however, held operated at contacts 1 of relay 110. When relay 110 restores, relays 80, 85 and 90 restore, since contacts 2 of relay 110 may restore after contacts 1 and since relay 100 is slow-to-release. Since relay 100 is slow-to-release, a charge remaining on capacitor C may now be discharged through contacts 2 of relay 100, contacts 4 of relay 110, and contacts 3 of relay 80.

The automatic balancing operation of the machine assembly 10 under control of the circuit 12, therefore, proceeds in the following manner: closure of switch S1 energizes lamp 52 and motors 22 and 62. A slight time delay, if desired, in the energization of motor 63 is provided by a bimetal element 114 to permit motor 22 to reach full speed. The workpiece 28 and disc 34 are, therefore, rotated very rapidly at approximately 900 r.p.m., for example, while the disc 56 is rotated slowly by motor 63. The pickup device 30 may deliver a number of signals, but within a comparatively short time the slot 50 is aligned with cell 54 and a coincidence is established. The coincident circuit C1, therefore, operates relay 80. Relay 80 operates to terminate operation of motors 22 and 63 and prepares relay 90, motor 40 and solenoid 48 for operation.

When switch 82 closes, indicating the workpiece 28 is stopped, relay 85 operates and motor 40 and solenoid 48 are energized to again drive the workpiece 28 and disc 34 at slow speed into alignment with the cell 54 with the unbalanced position aligned with the drill. A second control signal is thus detected for operating relay 90 and indicating the unbalanced position is properly located.

Relay 90 prevents operation of the motor 40 and instead operates the brake 84 and connects capacitor C to the voltage sensing circuit for enabling relay 110 to operate. Relay 110 operates the drill 65 to remove the excess material and balance the workpiece 28 whereafter the apparatus is released.

In FIG. 3 a somewhat simpler machine assembly and control arrangement than that shown in FIG. 1 is indicated by the reference characters 120 and 130 respectively. In this case the disc 32 together with the workpiece slow speed drive motor 40 and solenoid 48 are omitted. The motion sensing switch 82 is arranged to close when the workpiece spindle 24 has been considerably slowed, but not completely stopped so that it may, for example, rotate at 3 or 4 r.p.m. It then allows relay 90 to operate when the slot 50 is realigned with cell 54. The magnetic brake 84 is adapted to be energized immediately on energization of relay 80 and to slow the spindle and workpiece to a range in the desired speed, after which the brake is deenergized on operation of a second motion sensing switch 132. The switch 132 opens as soon as the speed drops to the desired range to deenergize the brake, whereafter the relay 90 is permitted to operate on closure of switch 82.

Thus relay 80 operates responsive to the appearance of coincident pulses at the circuit C1 as previously explained when the slot 50 is aligned with cell 54 and the unbalance position of workpiece 28 is passing beneath the drill 64. Relay 80 at its contacts 6 energizes the brake 84 through contacts 3 of relay 90 and the motion sensing switch 132.

The brake 84 slows the spindle 24 until the speed thereof is sufficiently low to enable switch 82 to close while switch 132 opens. Thus the workpiece and disc 56 now coast at slow speed since the brake 84 is deenergized by opening of switch 132. Switch 82 closes to enable relay 90 to energize over contacts 5 of relay 80 as soon as the slot 50 is again realigned with cell 54. With relay 90 energized, relay 110 is operated under control of capacitor C to operate drill 65 while brake 84 is reapplied over contacts 6 of relay 80 and contacts 5 of relay 90. This brings the workpiece 28 to an instant stop with the unbalance under drill 65, since the momentum of the workpiece is comparatively low at slow speed and it may be almost instantaneously braked. Thus the unbalance in the workpiece is automatically located and it is then balanced.

It will be appreciated, of course, that the elements such as the relays illustrated in the control circuits 12 and 130 may be replaced by a wide variety of devices including transistors or other solid state elements without departing from the scope of the present invention.

It will also be appreciated that the foregoing description incorporates several techniques for balancing rotatable devices; however, the inventive concepts are believed to be more explicitly covered in the accompanying claims.

What is claimed is:

1. An arrangement for locating a position of unbalance in a rotatable workpiece comprising first means adapted to rotate with said workpiece, second means adapted to rotate independently of said workpiece, third means for generating a pulse each time said first and second means are in a predetermined spacial relationship to each other, fourth means for generating a pulse each time said position of unbalance passes through a predetermined plane, means for terminating rotation of said second means in response to the simultaneous generation of said pulses, and for slowing rotation of said workpiece and said first means without stopping rotation of said workpiece, and means operable responsive to the subsequent realignment of said first and second means in said predetermined spacial relationship for thereafter terminating rotation of said first means and workpiece to locate said position of unbalance in said plane.

2. For use in a balancing machine of the type wherein a spindle for rotating a workpiece is adapted to swing in only one plane in response to vibration generated in said spindle by a position of unbalance in said workpiece whereby a pickup device located adjacent said plane and coupled to said spindle is adapted to generate an electrical pulse in response to each passage of said position of unbalance through said plane, the improvement comprising first means adapted to be moved in synchronism with said workpiece, other means adapted to be moved relative said first means and adapted to cooperate with said first means only when in one predetermined spacial relationship with said first means for generating an electrical pulse, and means operated only in response to the detection of a desired time relationship between the generation of a pulse by said pickup device and a pulse generated by said first and other means for terminating movement of said other means whereby a reference position for locating the position of said unbalance on said workpiece is established.

3. In the machine claimed in claim 2, means thereafter automatically operable for reestablishing said predetermined spacial relationship without stopping said workpiece to locate said unbalanced position in said plane and in said plane and stop said workpiece in said plane for drilling said workpiece in accordance with the degree of unbalance to automatically balance said workpiece.

4. A balancing machine of the type wherein a spindle for rotating a workpiece is adapted to swing in only one plane in response to vibration generated in said spindle by an unbalanced portion in said workpiece whereby a pickup device located adjacent said plane and coupled to said spindle is adapted to generate an electrical pulse in response to each passage of said unbalanced portion through said plane, the improvement comprising means adapted to be rotated with said workpiece for controlling the generation of an electrical pulse, other means adapted to be moved independently of said controlling means for generating an electrical pulse when in a predetermined spacial relationship to said controlling means, means for detecting the simultaneous generation of a pulse by said pickup device and said other means, means operated by said detecting means in response to said detection for immediately terminating movement of said other means whereby the location of said unbalanced portion with respect to said workpiece is ascertained, means thereafter automatically operated for rotating said controlling means into said predetermined spacial relationship with said other means to position the unbalanced portion of said workpiece in said plane, and means thereafter automatically operated for removing a portion of said workpiece conforming to the amount and position of said unbalanced portion.

5. A balancing machine of the type wherein a rotatable spindle for rotating a workpiece on one end of said spindle is adapted to swing in one plane in response to vibration generated in said spindle by an unbalanced portion in said workpiece whereby a pickup device adjacent said plane is adapted to generate an electrical pulse in response to each passage of said unbalanced portion through said plane, the improvement comprising a disc adapted to be rotated with said workpiece and having first means thereon for permitting the generation of an electrical pulse, a second disc rotatable independently and coaxially with said first disc and having a second means thereon for generating an electrical pulse only when in alignment with said first means, means for detecting the simultaneous generation of a pulse by said pickup device and said second means, means operated by said detecting means in response to said detection for immediately terminating rotation of said second disc whereby the location of said unbalanced portion with respect to said plane is ascertained, means thereafter operated for rotating said first means into alignment with said second means and terminating rotation of said workpiece to position the unbalanced portion of said workpiece in said plane, and means thereafter automatically operated for removing a portion of said workpiece conforming to the amount and position of said unbalanced portion.

6. The machine claimed in claim 5 in which said first means comprises a slot and said second means comprises an aligned light and photocell.

7. A balancing machine of the type wherein a spindle adapted to rotatably carry a workpiece on one end is permitted to swing in only one plane in response to vibration generated in said spindle by an unbalanced portion in said workpiece whereby a pickup device adjacent said plane is adapted to generate an electrical pulse in response to each passage of said unbalanced portion through said plane with said pulse varying in accord with the amount of unbalance in said portion, the improvement comprising means adapted to be rotated with said workpiece and carrying means thereon for gating an electrical signal, other means rotatable independently of said first means and workpiece and having means thereon gated by said gating means to generate an electrical signal only when in a predetermined relationship with said gating means, means for detecting the simultaneous generation of a pulse by said pickup device and a signal generated by said gated means, means operated by said detecting means in response to said simultaneous generation for immediately terminating rotation of said gated means whereby the location of said unbalanced portion with respect to said plane is ascertained, means thereafter operated for rotating said workpiece together with said gating means into alignment with said gated means to provide a second signal terminating rotation of said workpiece with the unbalanced portion of said workpiece in said plane, and means thereafter automatically operated for removing a portion of said workpiece conforming to the amount and position of said unbalanced portion.

References Cited by the Examiner

UNITED STATES PATENTS

| 2,821,858 | 2/1958 | King | 77—5 |
| 2,954,711 | 10/1960 | Hack | 77—5 |

FRANCIS S. HUSAR, *Primary Examiner.*